W. SCHULTZ.
SPRING REEL.
APPLICATION FILED MAY 24, 1916.
1,209,341.
Patented Dec. 19, 1916.
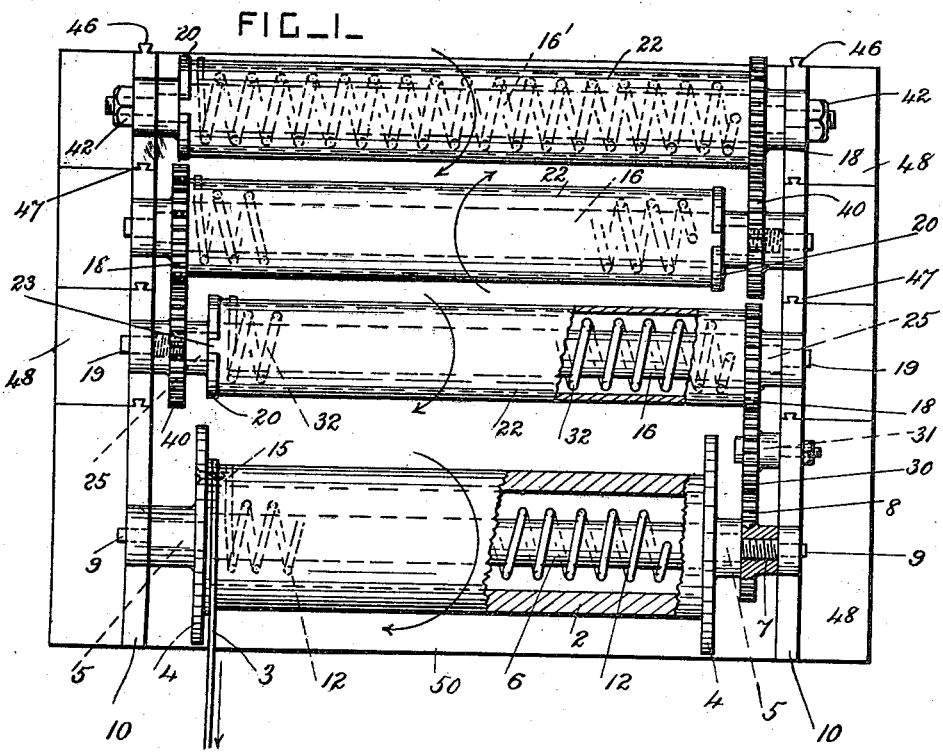
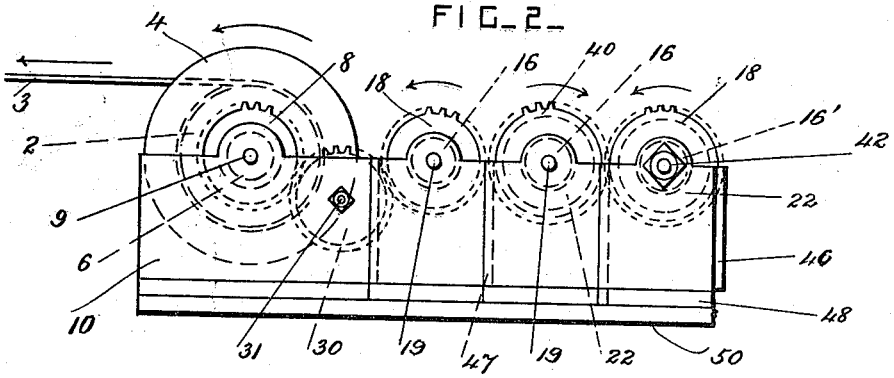
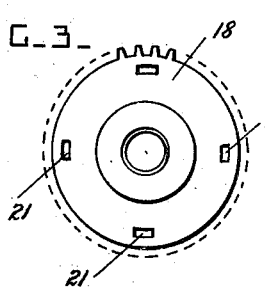
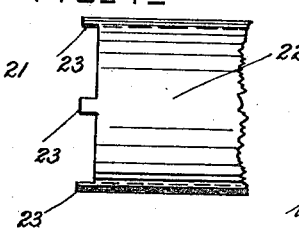
Inventor
William Schultz
by Herbert W. Jenner.
Attorney

UNITED STATES PATENT OFFICE.

WILLIAM SCHULTZ, OF CURTISS, WISCONSIN.

SPRING-REEL.

1,209,341.  Specification of Letters Patent.  Patented Dec. 19, 1916.

Application filed May 24, 1916. Serial No. 99,652.

*To all whom it may concern:*

Be it known that I, WILLIAM SCHULTZ, a citizen of the United States, residing at Curtiss, in the county of Clark and State of Wisconsin, have invented certain new and useful Improvements in Spring-Reels; and I do hereby declare the following to be a full, clear, and exact description of the invention, such as will enable others skilled in the art to which it appertains to make and use the same.

This invention relates to spring reels used for taking up the slack of hoisting and hauling ropes, wash-lines, and other similar flexible devices; and it consists in the novel construction and combination of the parts hereinafter fully described and claimed.

In the drawings, Figure 1 is a plan view of the reel, partially in section. Fig. 2 is an end view of the reel. Fig. 3 is a detail view of one of the toothed wheels. Fig. 4 is a detail view of the end portion of one of the rollers which engages with the toothed wheel.

The reel is provided with a main roller 2 upon which the cord 3 is wound. The cord 3 may be used for any purpose, and it is wound on the roller 2 automatically by springs as hereinafter fully described. The roller 2 has flanged end plates 4 which are journaled on the end portions 5 of a shaft 6. The shaft 6 has an extension 7 at one end upon which a toothed wheel 8 is secured in any approved way, and it may be screwed upon it. The extreme end portions 9 of the shaft 6 are journaled in bearings in a supporting stand 10. A helical spring 12 encircles the shaft 6 inside the roller 2, and one end 14 of it is secured to the shaft 6. The other end 15 of this spring is secured to the roller 2.

A second shaft 16 similar to the shaft 6, has its end portions 19 journaled in bearings in the stand 10. A roller or tubular spring casing 22 is provided and has bearings which are journaled on the end portions 25 of the shaft 16. This spring casing has a toothed wheel 18 at one end and a cap 20 at its other end. These parts have holes or notches 21, and the casing 22 has projections 23 which engage with these holes or notches, so that the wheel 18 and the cap 20 form the bearings which revolve on the end portions 25 of the shaft, and so that they may be readily disengaged from the tubular casing.

An idle toothed wheel 30 is supported by the stand 10 and a pin 31, and operatively connects the toothed wheels 8 and 18. A helical spring 32 is arranged around the shaft 16 inside the spring casing 22. One end of the spring 32 is secured to the spring casing, and its other end is secured to the shaft 16.

In the example shown, three similar spring casings 22 are provided, and have similar shafts and helical springs, and are operatively connected together and with the winding roller 2.

Toothed wheels 40 are provided and are secured on the end portions of the shafts 16, so that the spring casings and their shafts are connected together one after another in a series. The last spring casing of the series, which is farthest from the winding roller 2, has its shaft 16' rigidly secured to the stand 10 instead of being journaled in it, but otherwise this last spring casing and the parts connected to it are the same as those hereinbefore described.

In a simple form of this invention only one spring casing or winding device is provided and its shaft is then rigidly secured to the stand like the shaft 16'. Nuts 42 or other fastening devices may be used for securing the shaft 16' to the stand. This is done to anchor one end of the helical spring and it is not material whether the end shaft or the end casing is rigidly secured to the stand so that one end only of its helical spring is anchored. When the end casing is rigidly secured to the stand, the end shaft is revoluble and forms the auxiliary winding device, and is driven from the similar revoluble part which precedes it in the series.

In order that broken springs may be replaced with facility, the stand 10 is formed of a series of side plates arranged in pairs and provided with dovetailed tongues 46 and grooves 47. These side plates have flanges 48 at their bases and bolts (not shown) for securing them to a suitable base plate 50. The tongues are slidable in the grooves, and when any helical spring is broken, the side plates or sections of the stand pertaining to it are detached from the base plate and are slid upwardly out of engagement with the remaining side plates, and the spring casings are slid apart from their end pieces, so that suitable repairs can be made.

The roller 2 and the spring casings revolve in the direction of the curved arrows in the drawings when the cord 3 is pulled upon to unwind it. The spring 12 of the main roller is wound up first, or commences to be wound up first, and the springs of the auxiliary winding devices or spring casings are wound up one after another as the cord is unwound. The helical springs can be graduated in strength, if desired, so that one spring will be fully wound up before the next spring following it in the series commences to be wound, but this is not essential.

When a spring reel is constructed in this manner, a very great length of cord can be accommodated without subjecting it to an undesirable amount of strain when the greater part of it is unwound from the roller.

What I claim is:

1. In a spring reel, a supporting stand, a main roller for holding a cord, a shaft journaled in the stand and having the said roller journaled on it, a spring having its ends connected to the said roller and its shaft respectively, an auxiliary winding device arranged to one side of and parallel to the said main roller and also journaled in the stand, a spring anchored at one end and having its other end connected to the said auxiliary winding device, and means for positively connecting the auxiliary winding device with the said roller so that the springs are wound up as the cord is unwound from the roller.

2. In a spring reel, a supporting stand, a main roller for holding a cord, a shaft journaled in the stand and having the said roller journaled on it, a spring having its ends connected to the said roller and its shaft respectively, an auxiliary winding device arranged to one side of and parallel to the said main roller and also journaled in the stand, a spring anchored at one end and having its other end connected to the said auxiliary winding device, intermediate winding devices interposed between the auxiliary winding device and the main roller, each said intermediate winding device comprising a revoluble shaft, a spring casing revoluble on the said shaft, and a spring having its ends secured to the said casing and its shaft, and means for positively connecting all the said winding devices together and with the said roller so that the springs are wound up as the cord is unwound from the roller.

3. In a spring reel, a supporting stand, a main roller for holding a cord, a shaft journaled in the stand and having the said roller journaled on it, a spring having its ends connected to the said roller and its shaft respectively, a series of auxiliary winding devices each comprising a shaft mounted in the said stand, a spring casing journaled on the said shaft, and a spring having its ends secured to the said casing and its shaft respectively, means for anchoring one end of the spring of the last winding device of the series, and means for positively connecting the casings of all the said winding devices together and with the said roller so that the springs are wound up as the cord is unwound from the roller.

4. In a spring reel, a supporting stand provided with side plates formed in slidable sections connected together by tongues and grooves, said stand having also a base plate to which one end of each side plate is detachably secured, a series of winding devices each comprising a shaft mounted in a pair of the side plate sections, a spring casing having end pieces which are journaled on the said shaft, and a spring having its ends secured to the said casing and its shaft respectively, a winding roller for holding a cord, and means for connecting all the said winding devices together and with the said winding roller.

In testimony whereof I have affixed my signature.

WILLIAM SCHULTZ.

Copies of this patent may be obtained for five cents each, by addressing the "Commissioner of Patents, Washington, D. C."